Oct. 13, 1953    J. NAPOLI    2,655,001
PUMP AND TURBINE HYDRAULIC DRIVE
Filed March 29, 1952    3 Sheets-Sheet 1
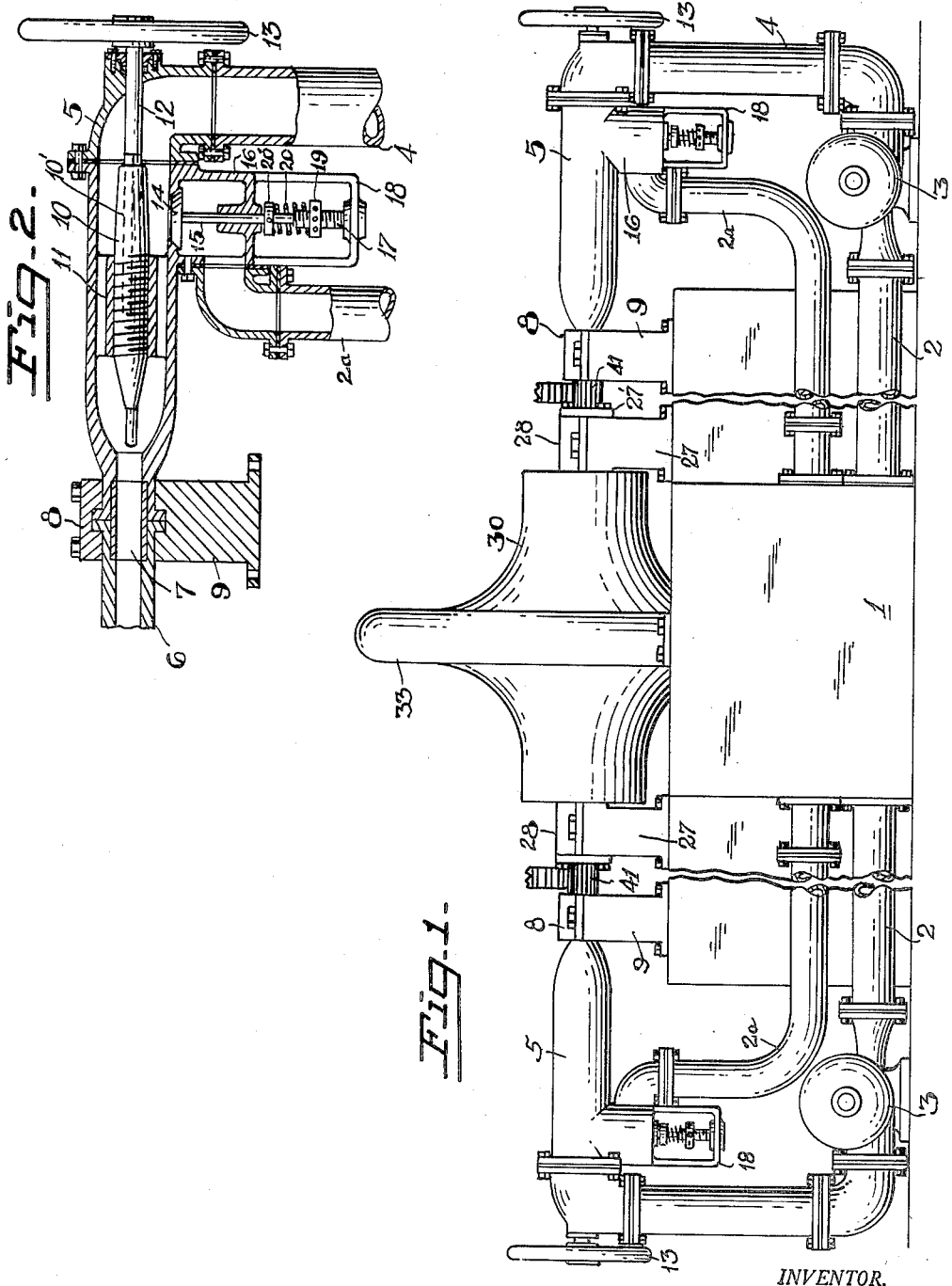
INVENTOR.
JOHN NAPOLI
BY
*J. E. Tralucco*
ATTORNEY

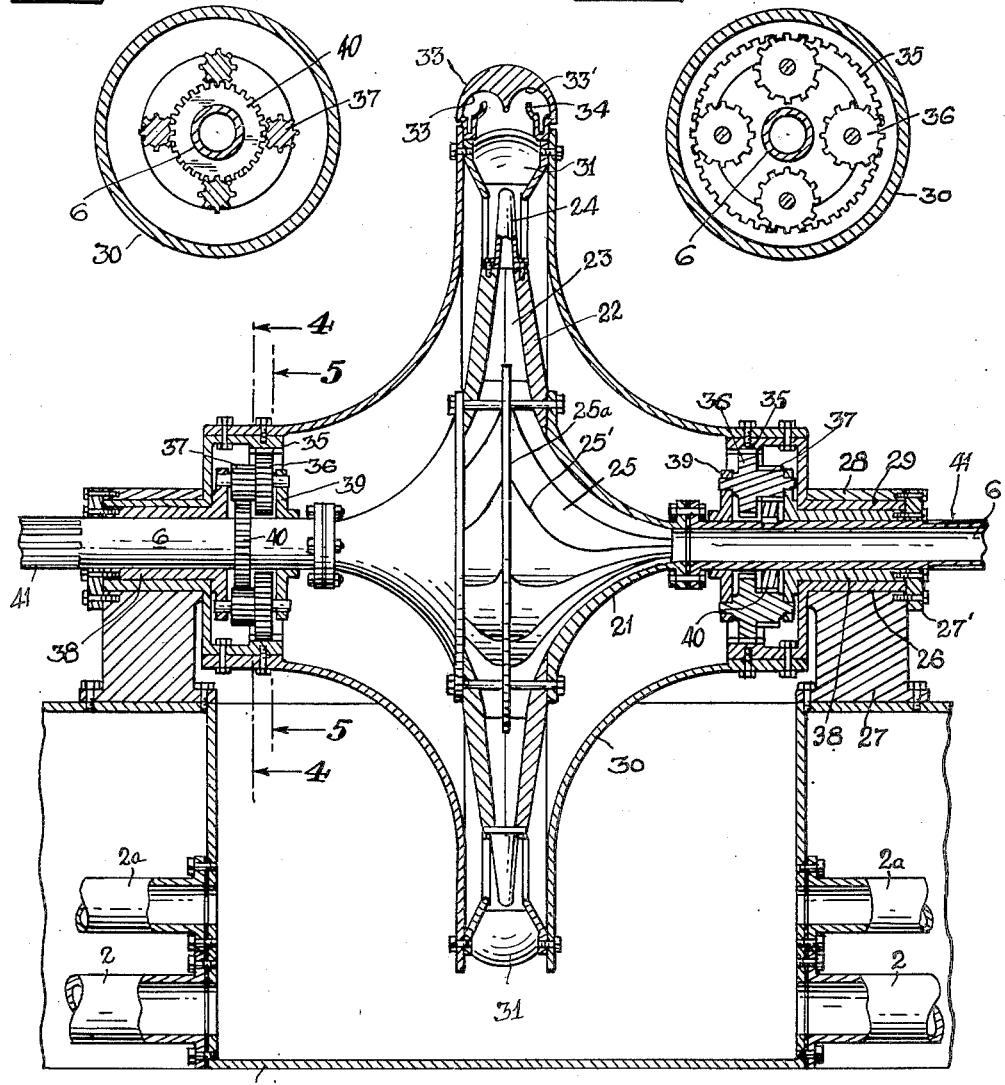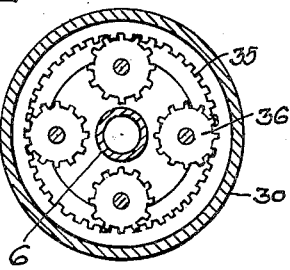

Oct. 13, 1953     J. NAPOLI     2,655,001

PUMP AND TURBINE HYDRAULIC DRIVE

Filed March 29, 1952     3 Sheets-Sheet 3

INVENTOR.
JOHN NAPOLI
BY
J E Tralrucco
ATTORNEY

Patented Oct. 13, 1953

2,655,001

UNITED STATES PATENT OFFICE 2,655,001

PUMP AND TURBINE HYDRAULIC DRIVE

John Napoli, Monterey, Calif.

Application March 29, 1952, Serial No. 279,486

2 Claims. (Cl. 60—54)

This invention relates to an improved power drive mechanism for apparatus for generating electrical energy.

The present invention provides improved apparatus embodying a rotatable water distributing member having a plurality of uniformly spaced outwardly extending discharge nozzles arranged to discharge streams of water tangentially against a number of peripheral blades carried by a rotor which is operatively connected to the water distributing member. The water distributing member and the rotor are mechanically connected so as to simultaneously rotate in opposite directions, and suitable means is provided for supplying water under pressure to the water distributing member. The water distributing member is provided with an axial core member having a plurality of spiral channels which are connected with and are adapted to convey water under pressure to the discharge nozzles, thereby reducing frictional resistance to a minimum. Control valves associated with the conduits leading to the water distributing member from the source of water supply are adapted to regulate the flow of water to the said distributing member in accordance with current requirements for electrical energy.

The present application is a continuation in part of my copending application filed January 3, 1949, Serial No. 68,990, issued May 13, 1952 as Patent No. 2,596,276, entitled "Power Drive Mechanism for Apparatus for Generating Electrical Energy."

The primary object of my invention is to provide an improved power plant for generating electrical energy of the kind characterized, embodying an interconnected rotor and water distributing member, the water distributing member having a plurality of circularly arranged and spaced nozzles arranged to direct water tangentially under pressure against a plurality of circularly arranged peripheral blades carried by the rotor.

Other and further objects of my invention will be pointed out hereinafter, or will be indicated in the appended claims, or will be obvious to one skilled in the art upon an understanding of the present disclosure. For the purpose of this application I have elected to show herein certain forms and details of apparatus for generating electrical energy or operating mechanical equipment representative of my invention; it is to be understood, however, that the embodiment of my invention herein shown and described is for the purpose of illustration only, and that therefore it is not to be regarded as exhaustive of the variations of the invention.

In the accompanying drawings:

Fig. 1 is a side elevation of a part of the apparatus embodying the principles of my invention;

Fig. 2 is an enlarged vertical sectional view of the one unit of the water inlet control means;

Fig. 3 is a vertical sectional view of a portion of the apparatus, showing parts of the water distributing member in elevation;

Fig. 4 is an enlarged sectional view taken on the line 4—4 of Fig. 3;

Fig. 5 is an enlarged sectional view taken on the line 5—5 of Fig. 3; and

Figure 6:
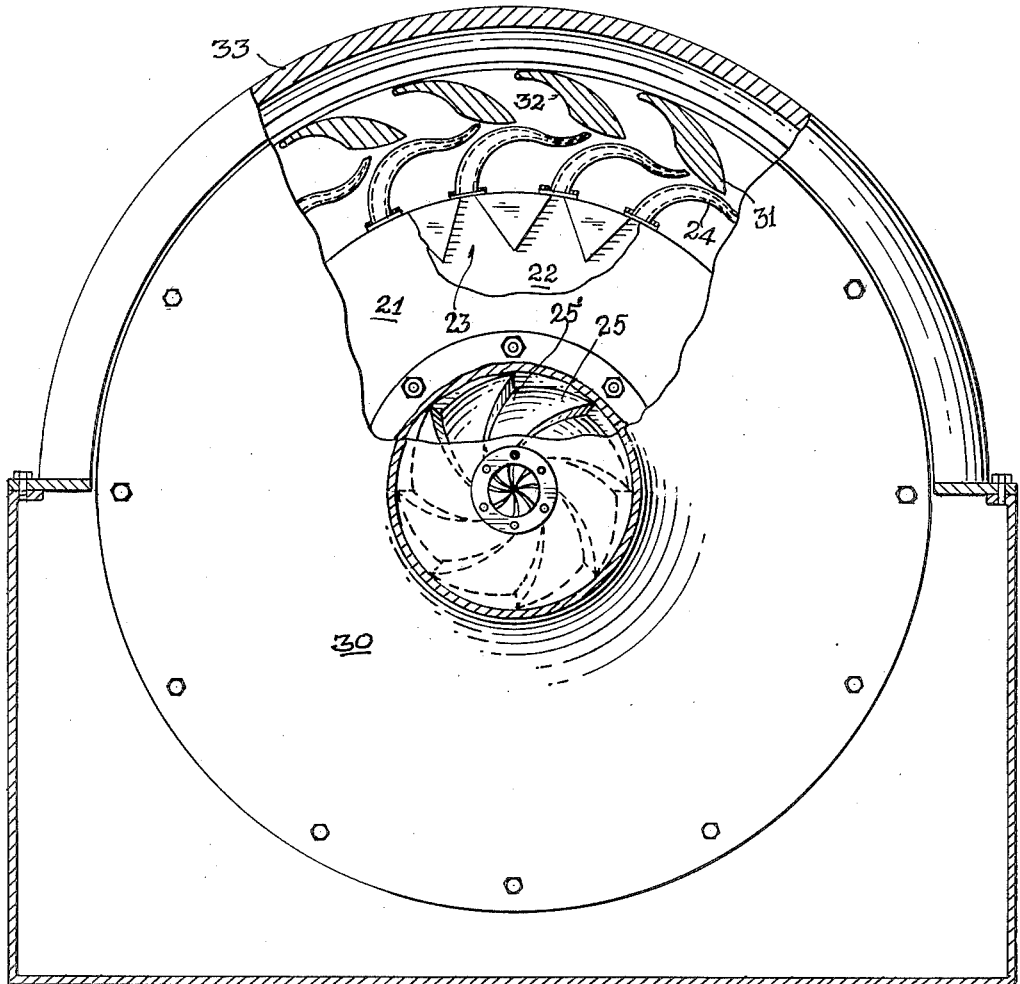
Fig. 6 is an end elevation of the water distributing member and rotor assembly, showing parts broken away and parts in section.

Referring to the drawings the numeral 1 designates a water tank in which a supply of water is held for the operation of the apparatus. It is to be understood that water may be supplied from other suitable sources if so desired. Connected to the tank below the water level are two lines 2 for conveying water to the inlets of electrically operated pumps 3. The outlets of the pumps are connected to conduits 4 which are connected to the inlet ends of valve casings 5, and the opposite or outlet ends of the said valve casings are connected to the inlet ends of aligned rotatable pipes 6. As shown in Fig. 2 the outlet end of each valve casing 5 and the inlet end of an associated rotatable pipe 6 are held in end to end relationship, and a sleeve 7 positioned in said adjoining ends of the valve casing and the rotatable pipe prevents leakage. The abutting flanged ends of the outlet ends of the valve casings 5 and the pipes 6 are held against displacement by grooved plates 8 which are bolted to grooved bases 9.

So as to control the water flowing into the pipes 6 when load requirements require such a change in flow, I have provided an adjustable valve element 10 in each valve casing 5, the said valve element having a tapered and small axial end portion which is arranged in operative relationship with the outlet end of the valve casing. Each valve element 10 is provided with a threaded central portion which operatively engages with threads on the central portion of a spider-like supporting structure 11 located in an associated valve casing 5, the said structure having side openings permitting the flow of water through the casing. The valve element is provided with an elongated axial opening 10' of irregular shape, and a rotatable rod 12 with a similarly shaped end portion slidably fits into the said opening, the said rod having a rotatable hand wheel 13 secured thereto. By rotating the wheel 13 in different directions the valve element 10 may be moved toward or away from the outlet of the valve casing 5, depending on which direction the said wheel is turned, thereby decreasing or increasing the flow of water through the valve casing and into the pipe 6.

The lower side of the valve casing 5 is provided with an emergency outlet opening which is controlled by a normally closed valve head 14, the said valve head having a depending valve stem 15. The valve stem 15 extends downwardly through a depending housing 16 secured to the valve casing 5, and the said stem is slidably supported in an externally threaded tubular bearing member 17 secured on a supporting structure 18 depending from the said housing. A rotatable adjusting nut 19 is threaded on the externally threaded bearing member 17 and a spiral compression spring 20 abuts the said nut and a protuberance 20' secured to the said valve stem. By adjusting the nut 19 upwardly or downwardly on the tubular bearing member 17 the upward pressure of the spring 20 on the valve head 14 may be increased or decreased, thereby regulating the amount of water pressure required to unseat the said valve head. Connecting the chamber of the housing 16 and the tank 1 is a return line 2a which conveys the water escaping from the valve casing 5 into the housing back to the tank. If for any reason the water does not flow freely through either of the valve casings 5 or the pipes 6 the back pressure will automatically open an associated valve head 14 and allow water entering the valve casing to return to the tank 1.

The rotatable pipes 6 are axially connected to the opposite sides of a hollow water distributing member 21 which has a centrally disposed water distributing element 22 bolted thereto, the said element having a series of uniformly spaced distributing channels 23 leading to a number of uniformly spaced peripheral outlet openings which are arranged to discharge water into suitably shaped discharge nozzles 24 secured to the periphery of the water distributing element 22. As shown in Fig. 6 the nozzles are uniformly spaced and similarly shaped, and a restricted outlet or discharge opening at the end of each is adapted to discharge water somewhat tangentially with considerable velocity. Secured within and rotatable with the water distributing member 21 is a spirally grooved core 25 which has a plurality of similarly shaped spiral water conveying channels 25' at the opposite sides of its central periphery 25a. The spiral channels 25' connect the rotatable pipes 6 and the channels 23 of the water distributing element 22. The water flowing outwardly with considerable velocity through the spiral channels 25' impinges against the curved sides of the said channels and thereby imparts counter-clockwise (Fig. 6) rotary motion to the core 25 and the water distributing member 21. The rotatable pipes 6 are supported in flanged stationary bearing members 26, which are secured to supporting bases 27 by thrust collars 27'. Rotatably supported on the bearing members 26 and arranged in contacting relation with the bases 27 and arcuate members 28 are the hub portions 29 of a hollow rotor 30. The hub portions 29 of the rotor abut the thrust collars 27', and the latter are so designed and constructed as to prevent any leakage through this bearing structure.

A hollow rotor 30 is positioned in an enclosing position with respect to the water distributing member 21 and its nozzles 24. At the periphery of the rotor are arranged a plurality of suitably spaced deflector blades or members 31 which have uniformly curved surfaces 32 against which the water discharged from the nozzles 24 impinges. The outer ends of the nozzles 24 and the inner edges of the blades 31 are so arranged that they slightly clear each other, and as the blades and nozzles rotate in opposite directions the jets of water discharged from the nozzles forcibly strike against upwardly curved surfaces 32 of the said blades, thereby exerting pressures in a clockwise direction upon the blades and the rotor. The deflector blades 31 are suitably spaced one from another so that water discharged from the nozzles after striking against the said blades passes outwardly without creating any back pressure which might resist the rotation of the rotor 30 or the water distributing member 21. Arranged around the upper portions of the rotor's periphery is a housing 33 which has its inner side formed with oppositely curved surfaces 33' which join along a centrally disposed apex. The curved surfaces 33' of the housing 33 direct the water striking them in outward directions, and inwardly and upwardly disposed flanges 34 secured to the opposite sides of the housing are adapted to intercept the water and convey it back to the tank beneath.

The nozzles are so uniformly shaped, constructed and arranged that they simultaneously discharge streams of water somewhat tangentially against the spaced deflector blades 31 of the rotor 30. The curved surfaces 32 of the blades 31 being positioned to intercept streams of water discharged from the nozzles 24 are arranged so that when a stream from one nozzle passes across and from the surface of one blade it will immediately intercept and strike against a succeeding blade, and so on around the rotor. The force of the streams of water striking against the blades 31 causes the rotor 30 to rotate in a clockwise direction (Fig. 6). The discharge of the water from the nozzles causes rotary motion in a counter-clockwise direction to be imparted to the water distributing member 21 (Fig. 6).

Secured to the hub portions 29 of the rotor 30 are internal ring gears 35 which mesh with gears 36, each of the latter being secured to or formed integrally with a similar but smaller gear 37. The axis of each set of gears 36 and 37 is rotatably mounted on the flanged portion of a stationary bearing member 38 and on a disc 39 loosely mounted on a rotatable pipe 6. As shown in Figs. 4 and 5 there are four sets of gears 36 and 37 arranged in the opposite end portions of the rotor's hub. The smaller gears 37 are in mesh with ring gears 40 which are keyed to the rotatable pipes 6. It will therefore be noted that as the rotor 30 is rotated as previously described in a clockwise direction it will simultaneously impart rotary motion to the pipes 6 and cause the water distributing member 21 to rotate in the opposite direction. Formed on or suitably secured to the pipes 6 are circular gears 41 which are operatively connected in the usual manner by gears or other mechanical means to an electrical generator or other mechanism which is to be operated.

What I claim is:

1. In apparatus of the character described, a hollow rotatable water distributing member mounted for rotation about a horizontal axis and carrying a plurality of circularly arranged and uniformly spaced nozzles the said water distributing member having axial water inlet openings in its opposite ends, rotatable axial pipes secured to the opposite ends of the water distributing member and having communication with the inlet openings of the said water distributing member, a core member secured to and positioned centrally inside the water distributing member, the said core member having a plurality of uniformly spaced spiral water conveying channels connecting the axial pipes and the nozzles, a rotatable hollow rotor enclosing the water distributing member and mounted for rotation in a direction opposite to the direction of rotation of the water distributing member, a number of spaced peripheral blades carried by the rotor and arranged to intercept the streams of water discharged by the nozzles, mechanical coupling means operatively connecting the water distributing member and the rotor, whereby the said member and the rotor are simultaneously rotated, and means for supplying water under pressure to the axial pipes.

2. In apparatus of the character described, a hollow rotatable water distributing member mounted for rotation about a horizontal axis and carrying a plurality of circularly arranged and uniformly spaced nozzles, the said water distributing member having axial water inlet openings in its opposite ends, a water supply tank positioned beneath the water distributing member, rotatable axial pipes secured to the opposite ends of the water distributing member, pump means having inlets connected to the tank and outlets connected to the pipes, a core member secured to and positioned centrally in the water distributing member, the said core member having a plurality of uniformly spaced spiral water conveying channels in its sides connecting the axial pipes and the nozzles, a rotatable hollow rotor enclosing the water distributing member and mounted for rotation in a direction opposite to the direction of rotation of the water distributing member, a plurality of spaced peripheral blades carried by the rotor and arranged to intercept the streams of water discharged by the nozzles, and mechanical coupling means operatively connecting the water distributing member and the rotor, whereby the water distributing member and the rotor are simultaneously rotated.

JOHN NAPOLI.

References Cited in the file of this patent

UNITED STATES PATENTS

| Number | Name | Date |
| --- | --- | --- |
| 111,538 | Herron | Feb. 7, 1871 |
| 137,171 | Bloch | Mar. 25, 1873 |
| 624,352 | Lighthall | May 2, 1899 |
| 643,938 | Brady | Feb. 20, 1900 |
| 693,946 | Boyce | Feb. 25, 1902 |
| 743,055 | Boqvist | Nov. 3, 1903 |
| 933,236 | Dahlstedt | Sept. 7, 1909 |
| 1,434,672 | Bentley | Nov. 7, 1922 |
| 1,449,472 | Wesson | Mar. 27, 1923 |
| 1,994,501 | Brooke | Mar. 19, 1935 |
| 2,596,276 | Napoli | May 13, 1952 |